United States Patent
Frank et al.

(10) Patent No.: US 10,452,118 B2
(45) Date of Patent: *Oct. 22, 2019

(54) UNBALANCED LOAD SHARING WITH PARALLEL POWER SUPPLIES

(71) Applicant: INTERNATIONAL BUSINESS MACHINES CORPORATION, Armonk, NY (US)

(72) Inventors: Yaacov Frank, Ramot Meir (IL); Mudi M. Fluman, Haifa (IL); Igor Nabutovsky, Beit-Shemesh (IL); Shay Saffer, Nir Galim (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 15/628,885

(22) Filed: Jun. 21, 2017

(65) Prior Publication Data
US 2017/0285723 A1    Oct. 5, 2017

Related U.S. Application Data

(63) Continuation of application No. 14/755,460, filed on Jun. 30, 2015, now Pat. No. 9,720,482.

(51) Int. Cl.
*G06F 1/26*   (2006.01)
*G06F 1/32*   (2019.01)
(Continued)

(52) U.S. Cl.
CPC ............ *G06F 1/3234* (2013.01); *G06F 1/263* (2013.01); *G06F 1/28* (2013.01); *G06F 1/30* (2013.01);
(Continued)

(58) Field of Classification Search
CPC .......... G06F 1/3234; G06F 1/30; G06F 1/263; G06F 1/28; G06F 1/26; G06F 11/2015;
(Continued)

(56) References Cited

U.S. PATENT DOCUMENTS 4,618,779 A    10/1986   Wiscombe
6,583,523 B1    6/2003   Bhate
(Continued)

FOREIGN PATENT DOCUMENTS

WO    2014051587 A1    4/2014

OTHER PUBLICATIONS

Kuroda et al., "High-Efficiency Power Supply System for Server Machines in Data Center," IEEE, 2013 (6 pages).
(Continued)

*Primary Examiner* — Xuxing Chen
(74) *Attorney, Agent, or Firm* — Griffiths & Seaton PLLC

(57) ABSTRACT

Methods, computing systems and computer program products implement embodiments of the present invention that include determining a required electrical power level for one or more computer elements. Upon selecting a first value indicating a first electrical power level that is less than the required electrical power level, the first value is conveyed to a first power supply unit (PSU), so that the first PSU delivers, to the one or more computer elements, the first electrical power level. A second value is selected that indicates a second electrical power level that is different from the first value, the second value indicating a difference between the required electrical power level and the first electrical power level. The second value is conveyed to a second PSU, so that upon receiving the second value, the second PSU delivers, to the one or more computer elements, the second electrical power level.

14 Claims, 3 Drawing Sheets

(51) Int. Cl.
*G06F 1/3234* (2019.01)
*G06F 1/28* (2006.01)
*G06F 1/30* (2006.01)
*G06F 11/20* (2006.01)
*H02J 3/00* (2006.01)
*H02J 1/10* (2006.01)
*H02J 1/00* (2006.01)
*H02J 3/38* (2006.01)

(52) U.S. Cl.
CPC ............ *G06F 1/26* (2013.01); *G06F 11/2015* (2013.01); *H02J 1/10* (2013.01); *H02J 3/00* (2013.01); *H02J 3/38* (2013.01); *H02J 2001/008* (2013.01)

(58) Field of Classification Search
CPC .......... H02J 3/38; H02J 2001/008; H02J 1/10; H02J 3/00
See application file for complete search history.

(56) References Cited

U.S. PATENT DOCUMENTS

| | | |
|---|---|---|
| 8,400,795 B2 | 3/2013 | Blackwell et al. |
| 2010/0097044 A1 | 4/2010 | Gipson |
| 2010/0327655 A1 | 12/2010 | Okamoto et al. |
| 2011/0205769 A1 | 8/2011 | Blackwell et al. |
| 2012/0303993 A1 | 11/2012 | Nishtala et al. |
| 2016/0329740 A1* | 11/2016 | Oh .................. H02J 7/007 |

OTHER PUBLICATIONS

Kim et al., "On/Off Control of Boost PFC Converters to Improve Light-Load Efficiency in Paralleled Power Supply Units for Servers," IEEE Transactions on Industrial Electronics, vol. 61, No. 3, Mar. 2014 (8 pages).

IBM, "Autonomous Learning Algorithm for Power Management," An IP.com Prior Art Database Technical Disclosure, IPCOM000185155D, Jul. 14, 2009 (5 pages).

Ebbers et al., "Smarter Data Centers: Achieving Greater Efficiency," Red Paper, ibm.com/redbooks, Oct. 2011 (138 pages).

* cited by examiner

UNBALANCED LOAD SHARING WITH PARALLEL POWER SUPPLIES

CROSS REFERENCE TO RELATED APPLICATIONS

This Application is a Continuation of U.S. patent application Ser. No. 14/755,460, filed on Jun. 30, 2015.

FIELD OF THE INVENTION

The present invention relates generally to computer system power supply units, and specifically to improving energy efficiency by creating an imbalance between two parallel power supplies that deliver power to the computer system.

BACKGROUND

In reliability engineering, dual modular redundancy is when elements of a system are duplicated, providing redundancy in case of a failure of a given element. In systems implementing dual modular redundancy, the duplicated elements work in parallel. A typical example is a complex computer system which has duplicated nodes, so that should one node fail, another is ready to carry on its work. In addition to designing a system with duplicated nodes, redundancy can be implemented by duplicating elements such as processors, memory modules, storage devices and power supplies.

The description above is presented as a general overview of related art in this field and should not be construed as an admission that any of the information it contains constitutes prior art against the present patent application.

SUMMARY

There is provided, in accordance with an embodiment of the present invention a method, including determining, by a power controller, a required electrical power level for one or more computer elements, selecting a first value indicating a first electrical power level less than the required electrical power level, conveying, to a first power supply unit, the first value so that the first power supply unit delivers, to the one or more computer elements, the first electrical power level indicated by the first value, selecting a second value indicating a second electrical power level different than the first electrical power level, the second value indicating a difference between the required electrical power level and the first electrical power level, and conveying the second value to a second power supply unit so that upon receiving the second value, the second power supply unit delivers, to the one or more computer elements, the second electrical power level indicated by the second value. Prior to determining the required electrical power level, an efficient electrical power range is specified, and selecting the value comprises selecting a given value so that a higher of the first and the second electrical power levels is within the efficient electrical power range

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
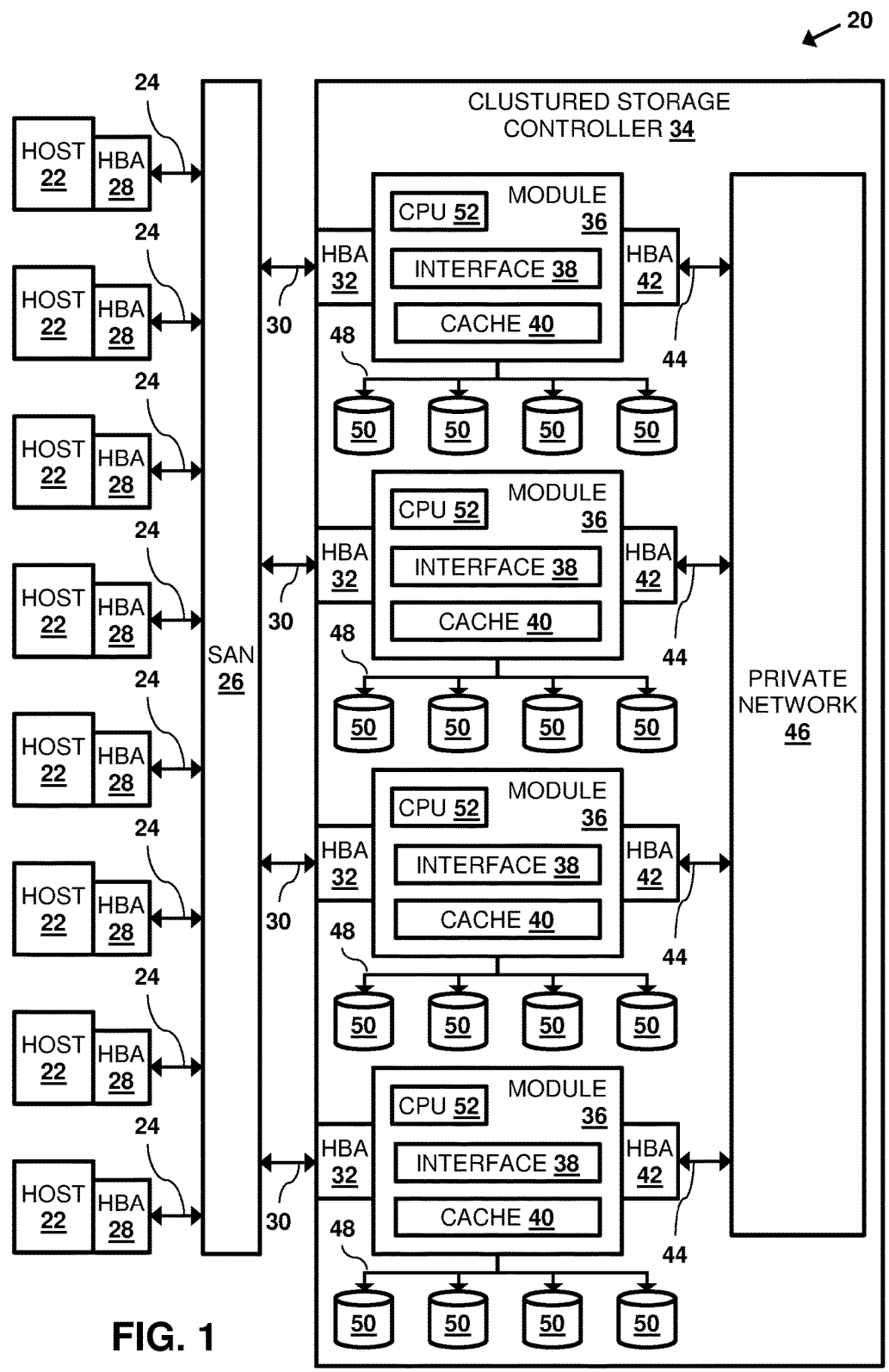
FIG. 1 is a block diagram that schematically illustrates a storage system comprising a storage controller comprising multiple modules having respective multiple storage devices, in accordance with an embodiment of the present invention.

Many high availability computer systems such as servers are designed with two or more paralleled power supply units (PSUs). Having multiple PSUs enables servers to operate from two different power grids, and to continue to operate following a failure of a given PSU by drawing power from any remaining functional PSUs. Paralleled PSUs in a server are typically coupled to a "share bus" in order to balance an electrical load between the PSUs.

When using a share bus to balance an electrical load between multiple PSUs, a given PSU measures its output electrical power, and then "pushes" (i.e., delivers), to the share bus, a voltage that indicates the output electrical power. Since all parallel PSUs in the server also push their respective voltages on the bus, the share bus voltage is equal to an average or a maximum (i.e., depending on the implementation) voltage of all the PSUs pushing their respective voltages to the share bus. In addition to pushing a respective PSU voltage to the share bus, each of the paralleled PSUs also reads the share bus voltage from the share bus. Since the share bus voltage represents the average or maximum electrical power which is supplied by all of the PSUs, the PSUs can automatically adjust their respective output electrical powers to match an electrical power indicated by the share bus voltage.

When designing a server with paralleled PSUs, a vendor typically specifies that each of the paralleled PSUs can individually power the server at full load. For example, a server may be configured with two 850 W PSUs, with each of the PSUs able to power all computer elements in the server. Examples of computer elements in a given server may comprise two CPUs, six DIMM per CPU, twelve 3.5 inch hard disk drives, six PCIe slots and ten fans with maximum speeds of 12,000 RPM. The server may consume 850 W when all this hardware is installed and fully utilized (including the fans rotating at their maximum speeds). Therefore, at full load, if both PSUs are load sharing, then each of the PSUs will supply about 50% of the load power (i.e., about 425 W).

However, operating all elements at their respective maximum utilizations is typically rare, and power consumption is usually much lower. For example, in the server configuration described supra, power consumption is typically below 300 W, resulting in each PSU contributing about 150 W, which is about 17% of its maximum specified load. In operation, PSUs operate at different efficiencies based on the power they are delivering.

In operation, power efficiency in most PSUs can be presented as a Gaussian bell-shaped distribution. For example, a utilization curve for a given PSU may show poor efficiency at less than 20% of their maximum loads, and best efficiency at 50% of their maximum loads. Therefore, the efficiency of the PSUs in a server can be segmented into efficiency ranges. In this example, a given PSU can be considered to operate at "low", "medium" and "high" efficiency levels when delivering the following percentage ranges of its maximum power load:

1%-19%: Low efficiency.
20-44%: Medium efficiency.
45%-60%: High efficiency.
61%-100%: Medium efficiency.

Embodiments of the present invention provide methods and systems for improving server power efficiency by causing an imbalance between the electrical power loads on the PSUs. During typical server utilization, the imbalance significantly increases the electrical power load on one of the PSUs, thereby improving its efficiency, while at the same time reducing the load on any remaining PSUs, and thereby reducing their respective efficiencies. In other words, using the efficiency ranges described supra, embodiments of the present invention distribute power from the PSUs so that if possible, as much power as possible is delivered by a first PSU operating at a higher efficiency, and the remaining power is delivered be a second PSU operating at a lower efficiency As described hereinbelow, upon a power controller determining a required electrical power level for one or more computer elements, a first value is selected that indicates a first electrical power level less than the required electrical power level. The first value is conveyed to a first power supply unit so that the first power supply unit delivers, to the one or more computer elements, the first electrical power level indicated by the first value. A second value is then selected that indicates a second electrical power level different than the first electrical power level, the second value comprising a difference between the required electrical power level and the first electrical power level. The second value is conveyed to a second power supply unit so that upon receiving the second value, the second power supply unit delivers, to the one or more computer elements the second electrical power level indicated by the second value.

Therefore, in embodiments of the present invention, if most of the power is being delivered by a given PSU that is operating at a higher efficiency, the overall efficiency of the paralleled PSUs increases since the given PSU is delivering power more efficiently (i.e., compared to if the power delivery was balanced evenly between the PSUs). For example, if balancing a low power requirement evenly between the PSUs results in both PSUs operating at a low efficiency, systems implementing embodiments of the present invention can reduce the overall power consumption of the PSUs by creating an imbalance so that as much power as possible is delivered by a first given PSU, thereby enabling the first given PSU to operate at a higher efficiency level. At the same time, while the first given PSU is delivering as much power as possible, any remaining paralleled PSUs can be configured to deliver a minimal electrical power load so that the one or more remaining PSUs can provide redundancy.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other elements of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller 34 comprising any multiple of modules 36 coupled to any plurality of storage devices 50 is considered to be with the spirit and scope of the present invention.

Figure 2:
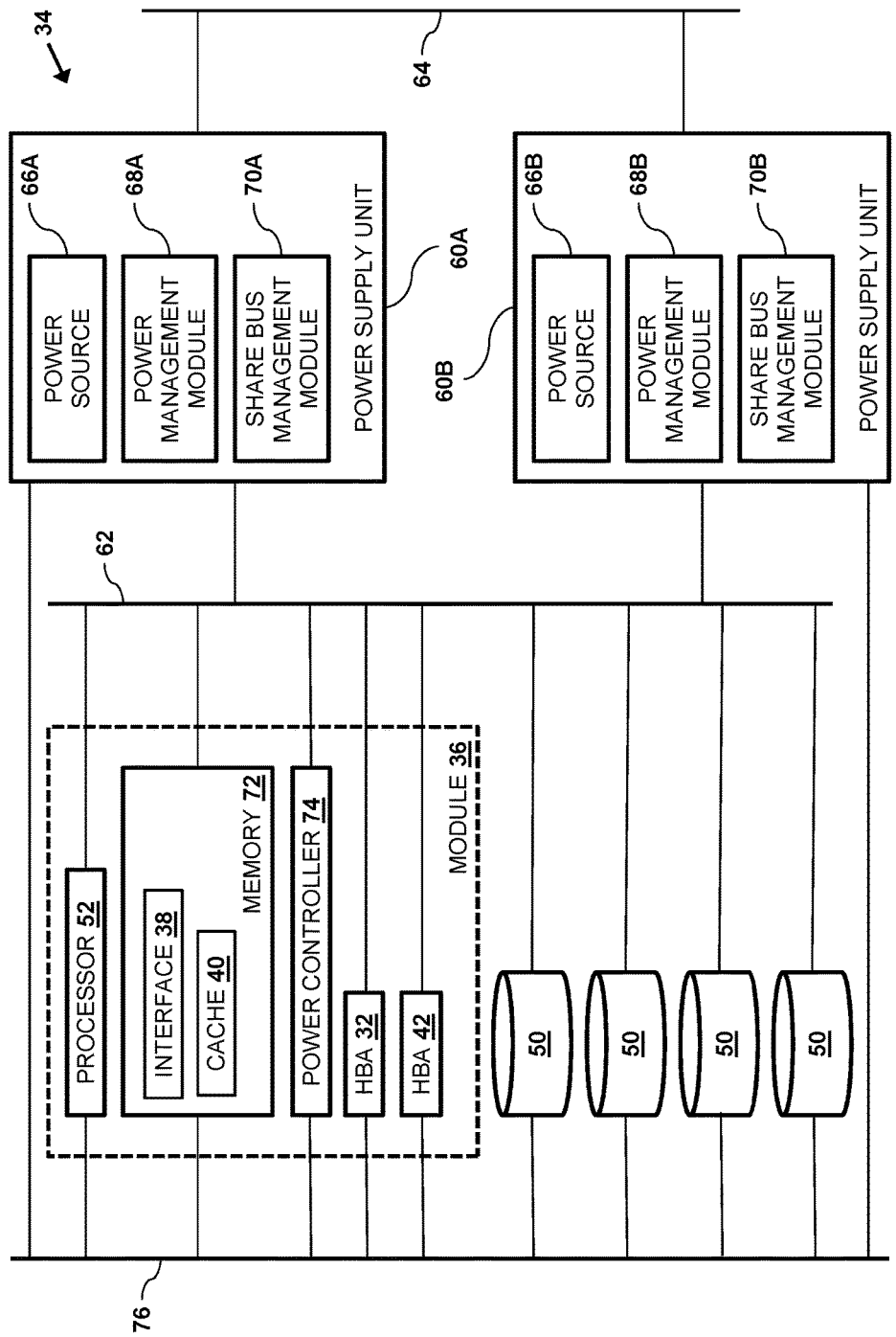
FIG. 2 is a block diagram that schematically illustrates a given module coupled to two paralleled power supply units, in accordance with an embodiment of the present invention.

FIG. 2 is a block diagram that schematically illustrates two paralleled power supply units (PSUs) 60 configured to power a given module 36 and storage devices 50 via a power bus 62 (e.g., a power rail), in accordance with an embodiment of the present invention. In the configuration shown in FIG. 2, PSUs 60 and their respective elements can be differentiated by appending a letter to the identifying numeral, so that the PSUs comprise PSU 60A and PSU 60B. In addition to being coupled to power bus 62, each PSU is coupled to a share bus 64. As described hereinbelow, a first given PSU 60 can control an electrical power delivered by a second given PSU 60 by "pushing" (i.e., delivering) a voltage to share bus 64.

Each PSU 60 comprises a power source 66 (e.g., a transformer), a power management module 68 and a share bus management module 70. In some embodiments, power management module 68 controls a level of an electrical power delivered from power source 66 to power bus 62 based on a share bus voltage that share bus management module 70 reads from share bus 64. In alternative embodiments, as described hereinbelow, power management module 68 controls the level of the electrical power delivered from power source 66 to power bus 62 based on an input received from a power controller 74.

In addition to reading the share bus voltage from share bus 64, share bus management module 70 also pushes a PSU voltage to the share bus, the PSU voltage indicating the power that power management module 68 is delivering to power bus 62. In some embodiments power management module 68 may comprise an adjustable amplifier (not shown) that PSU 60 can use to change the electrical power delivered to power bus 62.

In addition to processor 52, HBA 32 and HBA 42, module 36 comprises power controller 74 and a memory 72 that is configured to store interface 38 and cache 40. In embodiments of the present invention, processor 52, memory 72, storage devices 50, power controller 74, HBAs 32 and 42 comprise computer elements that are coupled to, and therefore be powered by PSUs 60 via power bus 62. Additionally, each of the elements are coupled to a data bus 76, thereby enabling processor 52, memory 72, storage devices 50, power controller 74 and HBAs 32 and 42 to communicate with one another. In embodiments of the present invention PSUs 60 are also coupled to data bus 76, thereby enabling power controller 74 to communicate with power management modules 68.

While the configuration in FIG. 2 shows module 36 comprising power controller 74, the power controller comprising a sub-element of any other element in storage controller 34 is considered to be within the spirit and scope of the present invention. For example, power controller 74 may be an element of PSU 60, or may be a standalone element that is coupled to both module 36 and the PSUs. Additionally, while embodiments herein describe creating an imbalance between two parallel power supply units 60 that deliver power to a given module 36 of storage controller 34, creating an imbalance between two or more parallel power supply units that power any type of computer system is considered to be within the spirit and scope of the present invention.

Processor 52 and power controller 74 comprises a general-purpose central processing unit (CPU) or special-purpose embedded processors (e.g., the power controller may comprise a complex programmable logic device or a baseboard management controller) which are programmed in software or firmware to carry out the functions described herein. The software may be downloaded to modules 36 and PSUs 60 in electronic form, over a network, for example, or it may be provided on non-transitory tangible media, such as optical, magnetic or electronic memory media. Alternatively, some or all of the functions of the processor may be carried out by dedicated or programmable digital hardware components, or using a combination of hardware and software elements.

In some embodiments, the functionality of power controller 74 may be implemented as a software application that processor 52 can execute from memory 72. In additional embodiments, power controller 74 may comprise an erasable programmable read only memory (EPROM) that is configured to store a lookup table listing power requirements for module 36 and a respective power split between PSU 60A and PSU 60B for each of the power requirements. For example, at 25% of maximum load, the table can store a split of 1%/24%, and at 90% of maximum load, the table can store a split of 45%/45%.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Unbalanced Power Distribution

Figure 3:
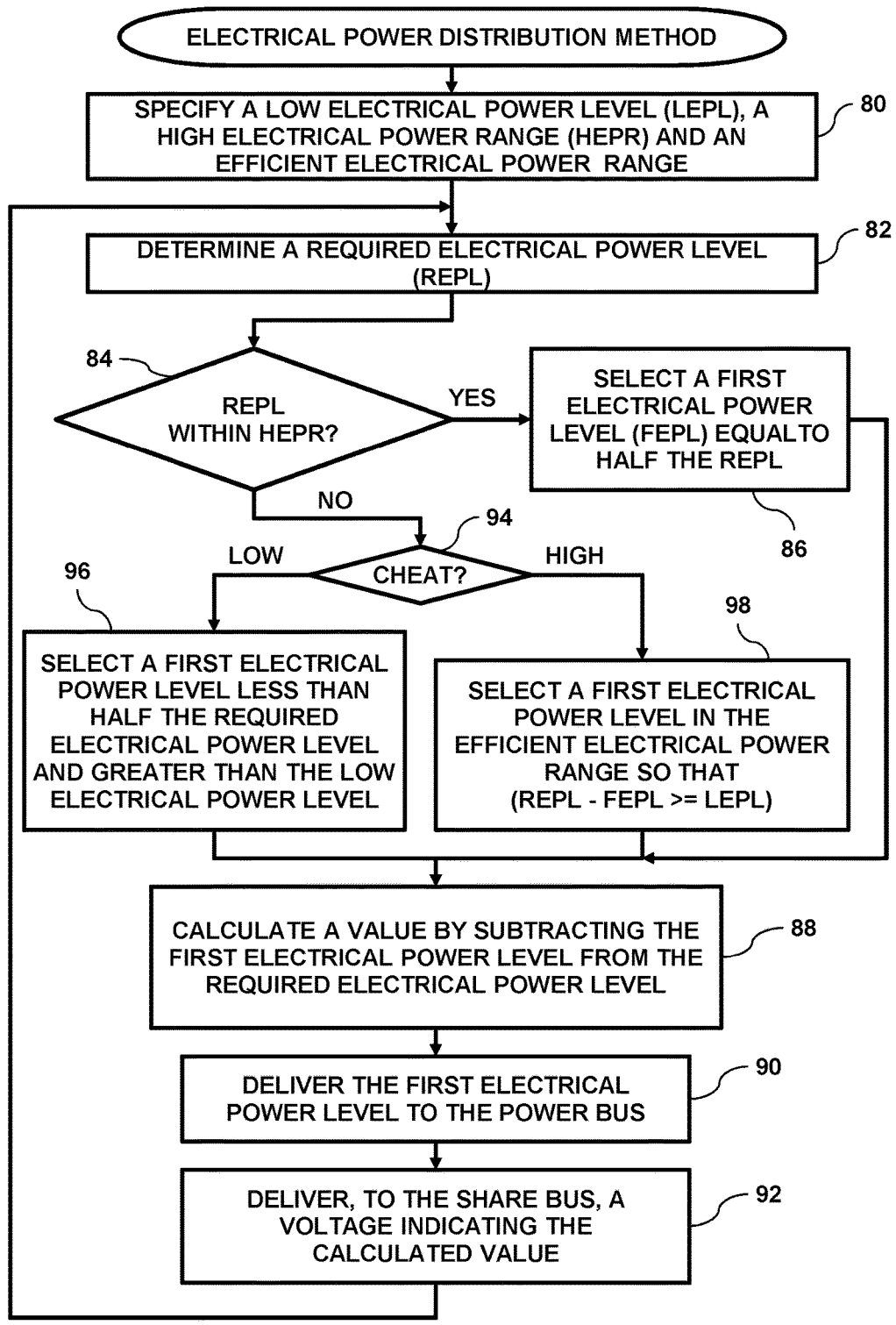
FIG. 3 is a flow diagram that schematically illustrates a method of unevenly distributing power from the paralleled power supply units to the given module, in accordance with an embodiment of the preset invention.

FIG. 3 is a flow diagram that schematically illustrates a method for creating an imbalance between two parallel power supply units 60 that deliver power to a given module 36, in accordance with an embodiment of the preset invention. In an initialization step 80, a low electrical power level, a high electrical power range and an efficient electrical power range are specified. While the example in the flow diagram describes PSU 60A "cheating" (i.e., pushing a voltage indicating an incorrect electrical power level to share bus 64), any of the PSUs cheating is considered to be within the spirit and scope of the present invention.

As described supra, a given PSU 60 can operate at low, medium and high efficiencies. Additionally, to provide redundancy, a first given PSU 60 typically needs to provide a minimum level of electrical power so that the first given PSU can take over in the event of a failure of a second given PSU 60.

In embodiments described herein, the low electrical power level comprises a minimum level of electrical power that a first given PSU 60 needs to deliver to power bus 62 in order to provide redundancy to a second given PSU 60, the efficient electrical power range comprises the electrical power levels in the PSU's medium efficiency range, and the high electrical power range comprises twice the electrical power levels in the PSUs high efficiency range. For example, each PSU 60 may comprise a 500 W PSU, and each of the PSUs operates in a low efficiency range when delivering 1%-19% of its maximum power, operates in a medium efficiency range when delivering 20%-44% and 61%-100% of its maximum power, and operates in a high efficiency range when delivering 45%-60% of the its maximum power. Therefore, if each PSU 60 comprises a 500 W PSU, the low electrical power level is 5 W, the efficient electrical power range is 100 W-224 W and 305 W-500 W, and the high electrical power range is 450 W-608 W, which is twice the power levels in the high efficiency range of 225 W-304 W.

In a determination step 82, share bus management module 70A determines the electrical power level required by the elements in module 36 and storage devices 50. In a first comparison step 84, if the required electrical power level is within the high electrical power range, then in a first select step 86, power controller 74 selects a first electrical power level equal to half the required power level. In other words, if the required power level is high enough that both PSUs 60 can operate in their respective high efficiency ranges, then there is no need for PSU 60A to "cheat".

In a calculation step 88, power controller 74 calculates a value by subtracting the first electrical power level from the required electrical power level. Upon calculating the value, power management module 68A delivers the first electrical power level to power bus 62 in a first delivery step 90, and in a delivery step 90, power management module 68A delivers, to share bus 64, a voltage level indicating the calculated value in a second delivery step 92, and the method continues with step 82.

Returning to step 84, if the required electrical power level is less than the high electrical power range, then in a second comparison step 94, power controller 74 selects if PSU 60A is going to cheat "high" or "low". In embodiments of the present invention, PSU 60A can cheat by placing a voltage on share bus 64 so that PSUs 60A and 60B deliver different electrical power levels to power bus 62.

For example, if required electrical power level is 500 watts, PSU 60A can cheat "low" by delivering 50 watts to power bus 62 and delivering a first voltage that indicates 450 watts to share bus 64. Upon reading the first voltage from share bus 64, PSU 60B delivers 450 watts to power bus 62 so that the total electrical power delivered by PSUs 60 to the power bus comprises 500 watts. Likewise, PSU 60A can cheat "high" by delivering 450 watts to power bus 62 and delivering a second voltage that indicates 50 watts to share bus 64. Upon reading the second voltage from share bus 64, PSU 60B delivers 50 watts to power bus 62 so that the total electrical power delivered by PSUs 60 to the power bus comprises 500 watts.

If PSU 60A is cheating "low", then in a second select step 96, power controller 74 selects a first electrical power level that is less than half the required power level and is greater than the low electrical power level, and the method continues with step 88. When cheating low, the first electrical power level may comprise the low electrical power level, so that as much electrical power as possible can be delivered by PSU 60B that is operating at a higher efficiency than PSU 60A since the second electrical power level is greater than the first electrical power level. Additionally, the first electrical power level should be greater than or equal to the low electrical power level, thereby ensuring that PSU 60A can provide redundancy in event of a failure of PSU 60B.

If PSU is cheating "high", then in a third select step 98, power controller 74 selects a first electrical power level that is within the efficient power range so that subtracting the first electrical power level from the required electrical power range results in a value greater than or equal to the low electrical power level, and the method continues with step 88. In other words, when selecting a first electrical power level in step 98, power controller 74 can ensure that higher of the first and the second electrical power levels is within the efficient electrical power range.

When cheating high, the first electrical power level may be selected so that the second electrical power level comprises the low electrical power level, thereby enabling as much electrical power as possible be delivered by PSU 60A that is operating at a higher efficiency than PSU 60B, since the first electrical power level is greater than the second electrical power level. Additionally, the first electrical power level should be selected so that the required electrical power level less the first electrical power level is greater than or equal to the low electrical power level, thereby ensuring that PSU 60B can provide redundancy in event of a failure of PSU 60A.

In a first embodiment, power controller 74 can use a formula to determine the first electrical power level, and in a second embodiment, PSUs 60 may comprise an EPROM (as described supra) configured to store a lookup table (not shown) that stores a respective first electrical power level value for each of multiple required electrical power level values), and power controller 74 can reference the lookup table to select the first electrical power level in steps 86, 96 and 98.

Simultaneously with steps 82-98, share bus management module 70B monitors the voltage on share bus 64 (i.e., the voltage delivered by PSU 60A in step 92), power management module 68B delivers, to power bus 62, a second electrical power level indicated by the voltage, and share bus management module 70B delivers, to the share bus, an additional voltage indicating the second electrical power level.

In an alternative embodiment, power controller 74 can affect "cheating" by conveying, to power supply 60B an offset, and power management module 68B can apply the offset to the voltage read from share bus 64 (i.e., which indicates the first electrical power level supplied by power supply 60A) in order to determine the second electrical power level to be supplied by power supply 60B. The offset may comprise a value (e.g., add 100 watts) or a percentage (e.g., multiply the first electrical power level by 2.5).

To determine power savings that can be effected using embodiments of the present invention, first define the following variables:

Let $W_T$ comprise the total power consumption of storage controller 34 at the PSU outlets (not shown).

Let $W_A$ comprise the power consumption at the outlet of PSU 60A.

Let $W_B$ comprise the power consumption at the outlet of PSU 60B.

Let $W_{X'}$ comprise the power consumption from the inlet of a given PSU 60 under outlet measured value $W_X$, wherein x can be A, B or T_.

Let $\eta_{(W)}$ comprise a function for a PSU efficiency curve (Efficiency %/Load %).

Let $\eta$ comprise a power consumption efficiency for storage controller 34.

Next, define the following dependencies:

$$W_A + W_B = W_T \qquad (1)$$

$$w_{X'} = \frac{w_X}{\eta(w) \mid W_X} \qquad (2)$$

$$\eta = \frac{W_{A'} + W_{B'}}{2 * W_{\frac{T'}{2}}} \qquad (3)$$

Next, decide whether unevenly loading the different PSUs is worthwhile using the following steps:
1. Power controller 74 should get access to the efficiency curve of each PSU 60 ($\eta_{(W)}$).
2. Power controller 74 polls the total power consumption from the PSU outlets of the storage controller 34 $W_T$.
3. Solve equation (2) for the measured $W_{T/2T}$ value. Save result $\eta$ measured.
4. Find the maximum value of efficiency according to different $W_A$ and $W_B$ for the specific $W_T$ measured in step 2, This can be done using a numeric solve function as suggested or any other mathematical way. For example, when $W_T$ is measured, $W_A$ is a variable and $W_B$ is calculated using equation (1).
5. Set $\eta_{max}$ to the result of step 4. If $\eta_{max} > \eta_{measured}$, then storage controller 34 can benefit from uneven load balancing and we would push $W_A$ as derived from ins step 4. However, If $\eta_{max} <= \eta_{measured}$, then keep working on evenly loading the PSUs with load set to $W_{T/2}$.
6. Every T seconds, poll the power consumption information (i.e., go to step 2).

For example, if the nominal power consumption of storage controller 34 is $W_T$=270 W and If PSUs 60A and 60B are both 850 W PSUs, then each PSU 60 supplies 135 W, which is 16% of its maximum load. If PSU efficiency at 16% load is almost 90%. then the power loss due to PSU efficiency is 30 W at best, based on the following equation:

$$\text{Inlet power} = \frac{\text{Outlet power}}{\eta(w) | W_{T/2}} \quad (4)$$

Therefore, in this example, Inlet power =270/09=300 W.
However, if PSU 60A supplies 95% of the total load and PSU 60B supplies the remaining 5% of the load, then:
$W_A$=270 W*0.95=256.5 W
$W_B$=300 W *0.045=13.5 W
$\eta_{(W)|256.5}$=92%
$\eta_{(W)|13.5}$=84% (i.e., the efficiency of PSU 60B at 13.5 W is 84%)
Inlet power=256.5 W/0.92+13.5W/0.84=294.9 W
Therefore, the power loss is 24.9 W instead of 30 W, resulting in a rise of the efficiency level from 90% to 91.5 %, which is considered to be a significant increase.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
    determining, by a power controller, a required electrical power level for one or more computer elements;
    selecting a first value indicating a first electrical power level less than the required electrical power level;
    conveying, to a first power supply unit, the first value so that that the first power supply unit delivers, to the one or more computer elements, the first electrical power level indicated by the first value;
    selecting a second value indicating a second electrical power level different than the first electrical power level, the second value comprising a difference between the required electrical power level and the first electrical power level;
    conveying the second value to a second power supply unit so that that upon receiving the second value, the second power supply unit delivers, to the one or more computer elements, the second electrical power level indicated by the second value; and
    prior to determining the required electrical power level, specifying an efficient electrical power range, and wherein selecting the value comprises selecting a given value so that a higher of the first and the second electrical power levels is within the efficient electrical power range.

2. The method according to claim 1, wherein the first and the second power supplies are coupled to a share bus, and wherein conveying the second value comprises conveying, by the power controller, the second value to the second power supply unit, and delivering, by the second power supply unit to the share bus, a voltage indicated by the second value.

3. The method according to claim 2, wherein receiving, by the second power supply unit, the second value comprises monitoring, by the second power supply unit, the voltage on the share bus.

4. The method according to claim 3, wherein the first and the second power supplies are coupled to a share bus, and wherein the second value comprises an offset, and wherein the second electrical power level comprises the offset applied to the first electrical power level.

5. The method according to claim 1, and comprising prior to determining the required electrical power level, specifying a low electrical power level, and wherein selecting the value comprises selecting a given value indicating a given electrical power level so that the first and the second electrical power levels are both greater than or equal to the low electrical power level.

6. An apparatus, comprising:
    one or more computer elements;
    a first and a second power supply units; and
    a power controller configured:
        to determine a required electrical power level for the one or more computer elements,
        to select a first value indicating a first electrical power level less than the required electrical power level, to convey, to the first power supply unit, the first value so that that the first power supply unit delivers, to the one or more computer elements, the first electrical power level indicated by the first value, to select a second value indicating a second electrical power level different than the first electrical power level, the second value comprising a difference between the required electrical power level and the first electrical power level, to convey the second value to a second power supply unit so that that upon receiving the second value, the second power supply unit delivers, to the one or more computer elements, the second electrical power level indicated by the second value, and prior to determining the required electrical power level, to specify an efficient electrical power range, and wherein selecting the value comprises selecting a given value so that a higher of the first and the second electrical power levels is within the efficient electrical power range.

7. The apparatus according to claim 6, wherein the first and the second power supplies are coupled to a share bus, and wherein the power controller is configured to convey the second value by conveying, by the power controller, the second value to the second power supply unit, and delivering, by the second power supply unit to the share bus, a voltage indicated by the second value.

8. The apparatus according to claim 7, wherein the second power supply unit is configured to receive the second value by monitoring the voltage on the share bus.

9. The apparatus according to claim 8, wherein the first and the second power supplies are coupled to a share bus, and wherein the second value comprises an offset, and wherein the second electrical power level comprises the offset applied to the first electrical power level.

10. The apparatus according to claim 6, wherein prior to determining the required electrical power level, the power controller is configured to specify a low electrical power level, and wherein the power controller is configured to select the value by selecting a given value indicating a given electrical power level so that the first and the second electrical power levels are both greater than or equal to the low electrical power level.

11. A computer program product, the computer program product comprising:
a non-transitory computer readable storage medium having computer readable program code embodied therewith, the computer readable program code comprising:
computer readable program code configured to determine, by a power controller, an electrical power level for one or more computer elements;
computer readable program code configured to select a first value indicating a first electrical power level less than the required electrical power level;
computer readable program code configured to convey, to a first power supply unit, the first value so that that the first power supply unit delivers, to the one or more computer elements, the first electrical power level indicated by the first value;
computer readable program code configured to select a second value indicating a second electrical power level different than the first electrical power level, the second value comprising a difference between the required electrical power level and the first electrical power level;
computer readable program code configured to convey the second value to a second power supply unit so that that upon receiving the second value, the second power supply unit delivers, to the one or more computer elements, the second electrical power level indicated by the second value; and
computer readable program code configured, prior to determining the required electrical power level, to specify an efficient electrical power range, and wherein the computer readable program code is configured to select the value by selecting a given value so that a higher of the first and the second electrical power levels is within the efficient electrical power range.

12. The computer program product according to claim 11, wherein the first and the second power supplies are coupled to a share bus, and wherein the computer readable program code is configured to convey the second value by conveying, by the power controller, the second value to the second power supply unit, and delivering, by the second power supply unit to the share bus, a voltage indicated by the second value, wherein the second power supply unit is configured to receive the second value by monitoring the voltage on the share bus.

13. The computer program product according to claim 12, wherein the first and the second power supplies are coupled to a share bus, and wherein the second value comprises an offset, and wherein the second electrical power level comprises the offset applied to the first electrical power level.

14. The computer program product according to claim 11, and comprising computer readable program code configured, prior to determining the required electrical power level, to specify a low electrical power level, and wherein the computer readable program code is configured to select the value by selecting a given value indicating a given electrical power level so that the first and the second electrical power levels are both greater than or equal to the low electrical power level.

\* \* \* \* \*